US012636724B2

(12) United States Patent
Yang

(10) Patent No.: US 12,636,724 B2
(45) Date of Patent: May 26, 2026

(54) METHOD OF CLEANING A BOTTOM PLATE

(71) Applicant: ABLEPRINT TECHNOLOGY CO., LTD., Hsinchu (TW)

(72) Inventor: Cheng-En Yang, Taichung (TW)

(73) Assignee: ABLEPRINT TECHNOLOGY CO., LTD., Hsinchu (TW)

( * ) Notice: Subject to any disclaimer, the term of this patent is extended or adjusted under 35 U.S.C. 154(b) by 0 days.

(21) Appl. No.: 18/776,257

(22) Filed: Jul. 18, 2024

(65) Prior Publication Data

US 2025/0050440 A1     Feb. 13, 2025

(51) Int. Cl.
B23K 1/00 (2006.01)
B23K 1/20 (2006.01)

(52) U.S. Cl.
CPC ............ B23K 1/206 (2013.01); B23K 1/0008 (2013.01)

(58) Field of Classification Search
CPC ............ B23K 1/00–206; B23K 1/0008; B23K 1/0016; B08B 3/102; B08B 3/106; B08B 3/10; B08B 9/02; H01L 21/6704; H01L 24/80; H01L 24/63; H01L 2224/80011; H01L 2224/80911; H01L 2224/80986
USPC ......... 228/179.1–180.22, 201–202, 205–207
See application file for complete search history.

(56) References Cited

U.S. PATENT DOCUMENTS 5,593,339 A * 1/1997 Yam ........................... B08B 7/02
451/36
7,435,711 B2 * 10/2008 Hori ...................... C11D 7/3218
134/40

2005/0109374 A1 * 5/2005 Letessier ................... B08B 9/00
134/198
2010/0192988 A1 * 8/2010 Saiki ......................... B08B 3/14
96/194
2014/0053867 A1 * 2/2014 Fang ...................... B08B 7/0035
134/1.1
2014/0087568 A1 * 3/2014 Noda ................ H01L 21/02277
134/1.1
2015/0031216 A1 * 1/2015 Akae ...................... C23C 16/345
118/704
2015/0232986 A1 * 8/2015 Kameda ........... C23C 16/45546
438/758

(Continued)

FOREIGN PATENT DOCUMENTS

CN          107030056 A  *  8/2017  .............. B08B 3/10
CN          111672817 A  *  9/2020  .............. G01N 1/34

(Continued)

*Primary Examiner* — Kiley S Stoner

(57)          ABSTRACT

A method of cleaning a bottom plate, including: providing an adjacent bottom plate with at least one soldering lug, filling a liquid material between the adjacent bottom plate and the soldering lug to cover the substance to be cleaned, and placing the adjacent bottom plate in a chamber, controlling a temperature of the chamber to 25-200° C., generating intermittent pressure increasing and reducing and/or intermittent vacuum pumping for a gas in the chamber using a pressure increasing and reducing device and/or a vacuum generator, causing a fluctuation change of the liquid material using a fluctuation change of the gas, rubbing and scrubbing the liquid material by the fluctuation using the fluctuation change of the gas, and taking the substance to be cleaned attached to the adjacent bottom plate away from the adjacent bottom plate.

3 Claims, 4 Drawing Sheets

(56)                    References Cited

U.S. PATENT DOCUMENTS

| | | | | |
|---|---|---|---|---|
| 2015/0376781 A1* | 12/2015 | Kogura | ............... | C23C 16/4405 |
| | | | | 438/758 |
| 2023/0313371 A1* | 10/2023 | Miyashita | ............. | C23C 16/308 |
| | | | | 438/758 |
| 2025/0050383 A1* | 2/2025 | Yang | ........................ | B08B 3/102 |
| 2025/0050440 A1* | 2/2025 | Yang | .................... | B23K 1/0016 |

FOREIGN PATENT DOCUMENTS

| | | | | | |
|---|---|---|---|---|---|
| CN | 113118121 A | * | 7/2021 | ............. | B08B 13/00 |
| CN | 116890005 A | * | 10/2023 | ............... | B08B 3/12 |
| KR | 102448321 B1 | * | 9/2022 | ........... | H01L 21/561 |
| TW | 201639049 A | * | 11/2016 | | |

\* cited by examiner

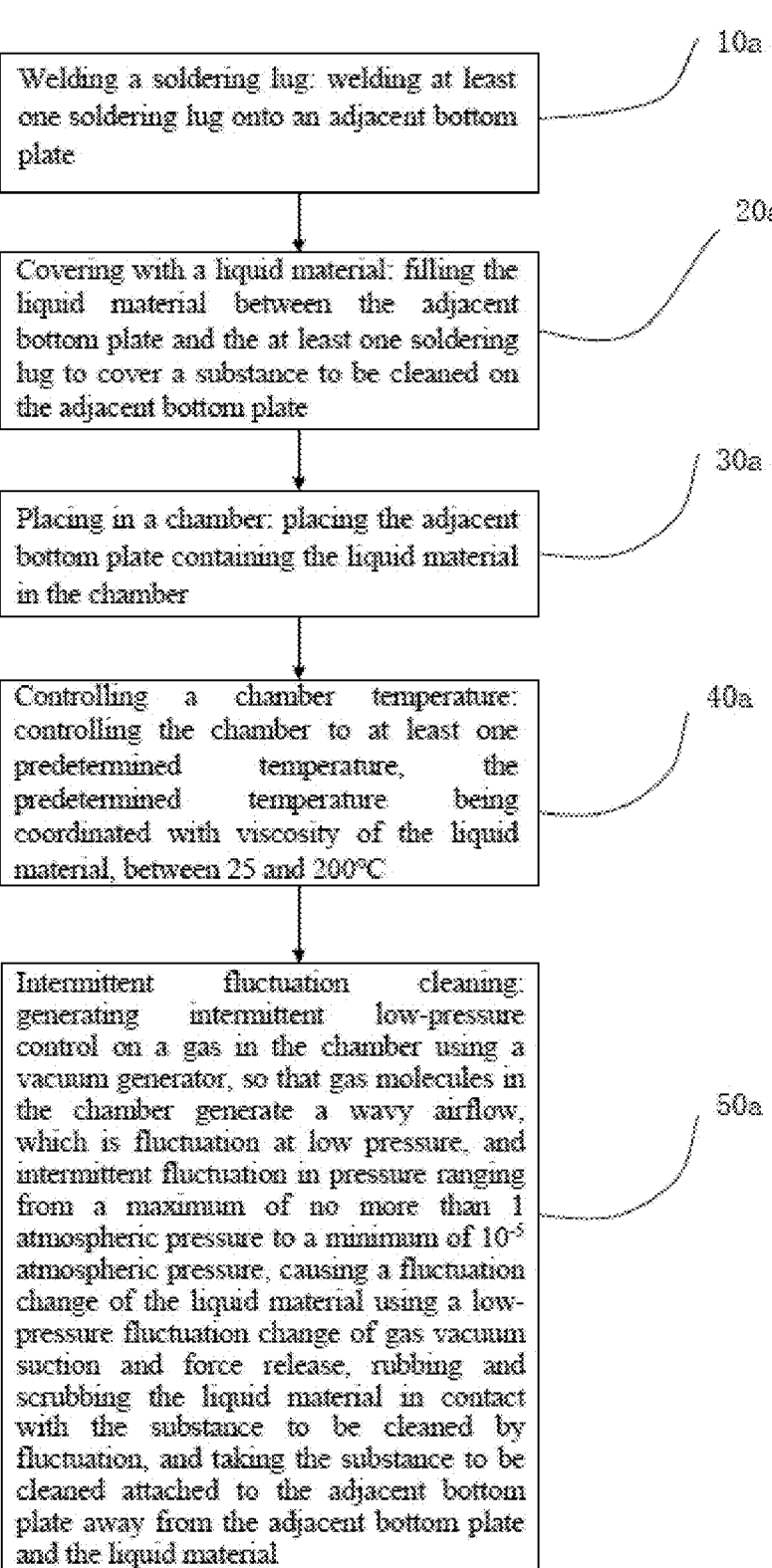

Welding a soldering lug: welding at least one soldering lug onto an adjacent bottom plate — 10a Covering with a liquid material: filling the liquid material between the adjacent bottom plate and the at least one soldering lug to cover a substance to be cleaned on the adjacent bottom plate — 20a Placing in a chamber: placing the adjacent bottom plate containing the liquid material in the chamber — 30a Controlling a chamber temperature: controlling the chamber to at least one predetermined temperature, the predetermined temperature being coordinated with viscosity of the liquid material, between 25 and 200°C — 40a Intermittent fluctuation cleaning: generating intermittent low-pressure control on a gas in the chamber using a vacuum generator, so that gas molecules in the chamber generate a wavy airflow, which is fluctuation at low pressure, and intermittent fluctuation in pressure ranging from a maximum of no more than 1 atmospheric pressure to a minimum of $10^{-5}$ atmospheric pressure, causing a fluctuation change of the liquid material using a low-pressure fluctuation change of gas vacuum suction and force release, rubbing and scrubbing the liquid material in contact with the substance to be cleaned by fluctuation, and taking the substance to be cleaned attached to the adjacent bottom plate away from the adjacent bottom plate and the liquid material — 50a

FIG. 1

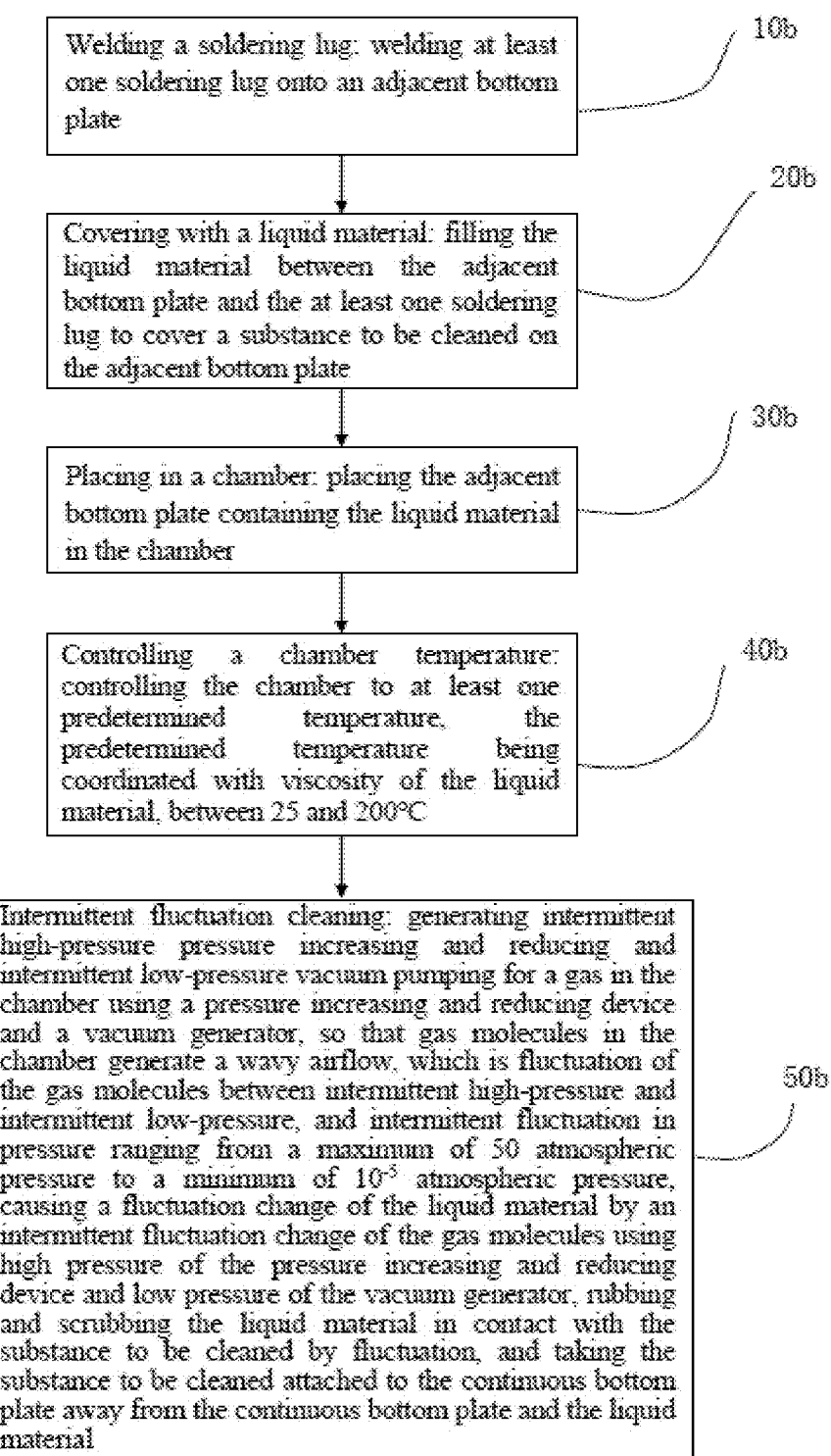

Welding a soldering lug: welding at least one soldering lug onto an adjacent bottom plate — 10b Covering with a liquid material: filling the liquid material between the adjacent bottom plate and the at least one soldering lug to cover a substance to be cleaned on the adjacent bottom plate — 20b Placing in a chamber: placing the adjacent bottom plate containing the liquid material in the chamber — 30b Controlling a chamber temperature: controlling the chamber to at least one predetermined temperature, the predetermined temperature being coordinated with viscosity of the liquid material, between 25 and 200°C — 40b Intermittent fluctuation cleaning: generating intermittent high-pressure pressure increasing and reducing and intermittent low-pressure vacuum pumping for a gas in the chamber using a pressure increasing and reducing device and a vacuum generator, so that gas molecules in the chamber generate a wavy airflow, which is fluctuation of the gas molecules between intermittent high-pressure and intermittent low-pressure, and intermittent fluctuation in pressure ranging from a maximum of 50 atmospheric pressure to a minimum of $10^{-5}$ atmospheric pressure, causing a fluctuation change of the liquid material by an intermittent fluctuation change of the gas molecules using high pressure of the pressure increasing and reducing device and low pressure of the vacuum generator, rubbing and scrubbing the liquid material in contact with the substance to be cleaned by fluctuation, and taking the substance to be cleaned attached to the continuous bottom plate away from the continuous bottom plate and the liquid material — 50b

FIG. 2

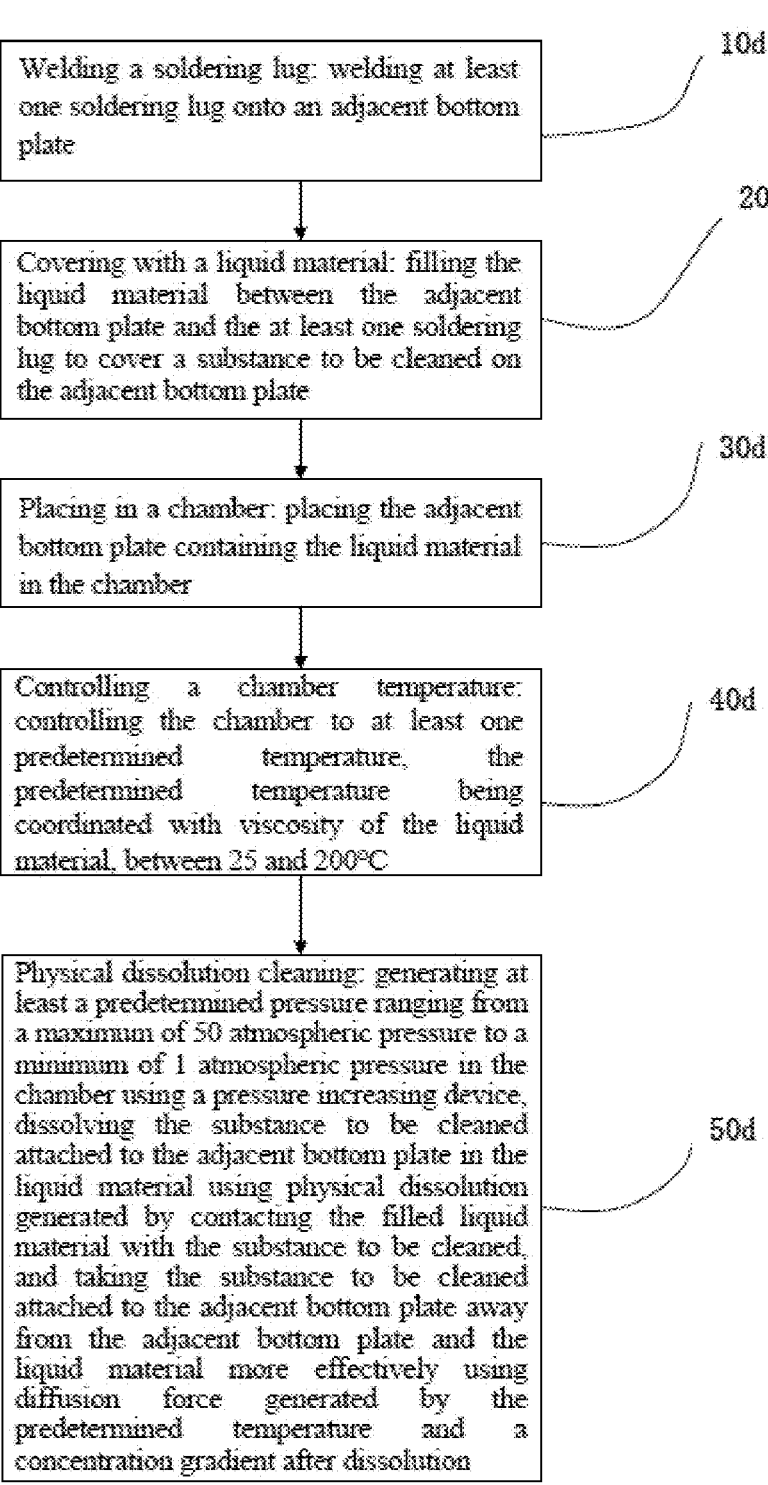

Welding a soldering lug: welding at least one soldering lug onto an adjacent bottom plate — 10d Covering with a liquid material: filling the liquid material between the adjacent bottom plate and the at least one soldering lug to cover a substance to be cleaned on the adjacent bottom plate — 20d Placing in a chamber: placing the adjacent bottom plate containing the liquid material in the chamber — 30d Controlling a chamber temperature: controlling the chamber to at least one predetermined temperature, the predetermined temperature being coordinated with viscosity of the liquid material, between 25 and 200°C — 40d Physical dissolution cleaning: generating at least a predetermined pressure ranging from a maximum of 50 atmospheric pressure to a minimum of 1 atmospheric pressure in the chamber using a pressure increasing device, dissolving the substance to be cleaned attached to the adjacent bottom plate in the liquid material using physical dissolution generated by contacting the filled liquid material with the substance to be cleaned, and taking the substance to be cleaned attached to the adjacent bottom plate away from the adjacent bottom plate and the liquid material more effectively using diffusion force generated by the predetermined temperature and a concentration gradient after dissolution — 50d

FIG. 4

METHOD OF CLEANING A BOTTOM PLATE

CROSS REFERENCE TO RELATED APPLICATIONS

The present application claims the benefit of Taiwanese Patent Application Nos. 112129914 filed on Aug. 9, 2023, and 113103482 filed on Jan. 30, 2024. All the above are hereby incorporated by reference in their entirety.

FIELD OF TECHNOLOGY

The present invention relates to the technical field of bottom plate cleaning, and in particular to a method of cleaning a bottom plate technically, which drives the rubbing or stirring effect of a liquid material through the combination of the liquid material and intermittent airflow fluctuation of increasing and reducing pressure, thereby improving the cleaning efficiency of residues.

BACKGROUND

In the manufacturing of advanced semiconductor components, adhesives are often used for bonding between materials, especially in metal bonding. Some adhesives usually have a high acid content and corrosiveness to remove the tight oxide layer formed on a bonding surface. However, the corrosive nature of this adhesive seriously affects the performance of microelectronic components. Therefore, it is necessary to perform a further cleaning step to remove the adhesive residue on the bonding surface or the reaction residue between the adhesive and metal oxides. Some adhesives may leave some organic matter behind after use and leave a layer of oil esters on the bonding surface. Such oil esters must also undergo a further cleaning step to avoid subsequent reliability issues with semiconductor components. However, as the wiring on an adjacent bottom plate becomes denser or the protrusions used for bonding on the adjacent bottom plate become smaller or the gap between the adjacent bottom plate and the soldering lug joint becomes narrower, the above residues become increasingly difficult to clean. If the corrosive adhesive residue on the adjacent bottom plate or joint is not completely removed, it will greatly reduce the reliability of the component. In addition, using commonly used cleaning solvents to clean the above-mentioned residues can have an impact on the environment if not handled properly.

Therefore, as regards the above-mentioned problems existing in the cleaning of advanced semiconductor component manufacturing, how to develop a method of cleaning a bottom plate that is further ideal and practical while considering economic benefits is the ardent expectation of consumers, and it is also the goal and direction for relevant practitioners to strive for research and development breakthroughs.

In view of this, the inventor has years of experience in the manufacturing, development and design of related products. Concerning the above objective, after detailed design and careful evaluation, a practical invention is finally obtained.

SUMMARY

The main purpose of the present invention is to provide a method of cleaning a bottom plate, which uses a liquid material to cover an adjacent bottom plate to be cleaned, placing the adjacent bottom plate in a chamber, elevating a temperature and applying intermittent airflow fluctuation of increasing and reducing pressure to drive a rubbing or stirring effect of the liquid material, thereby improving cleaning efficiency of a residue.

To achieve the above purpose, the present invention provides a method of cleaning a bottom plate, including: welding at least one soldering lug onto an adjacent bottom plate, filling a liquid material between the adjacent bottom plate and the soldering lug to cover a surface of the bottom plate of the substance to be cleaned: placing the adjacent bottom plate containing the liquid material in a chamber, controlling a temperature of the chamber to 25-200° C., generating intermittent pressure increasing and reducing and/or intermittent vacuum pumping for a gas in the chamber using a pressure increasing and reducing device and/or a vacuum generator to generate a fluctuation airflow through molecular motion, causing a fluctuation change of the liquid material by controlling a fluctuation change of the gas in the chamber to produce a wave-like fluctuation friction and rubbing cleaning effect, accelerating dissolution of the substance to be cleaned in the liquid material, such as adding sugar to water, and exerting an effect of stirring to accelerate dissolution of sugar, where fluctuation of the liquid material includes fluctuation under vacuum, fluctuation from high pressure to 1 atmospheric pressure or fluctuation from high pressure to vacuum, causing a fluctuation change of the liquid material using a fluctuation change of the gas, rubbing and scrubbing the liquid material in contact with the substance to be cleaned through large energy generated by fluctuation, and taking the substance to be cleaned attached to the adjacent bottom plate away from the adjacent bottom plate and the liquid material. In addition, controlling the temperature of the chamber to 25-200° C. in the above-mentioned chamber will also cause the existing oil ester film or some substances to be cleaned or the water vapor adsorbed inside the adjacent bottom plate as above to evaporate and produce gas due to heating. By using the fluctuation under vacuum, fluctuation from high pressure to 1 atmospheric pressure or fluctuation from high pressure to vacuum as above, and using the fluctuation change of the gas to cause the fluctuation change of the liquid material, multiple gases can also be discharged from the liquid material.

Regarding the technology, means, and effects adopted in the present invention, a preferred embodiment is hereby provided and detailed in conjunction with the appended drawings below. It is believed that the above purpose, structures, and features of the present invention can be further and specifically understood therefrom.

BRIEF DESCRIPTION OF THE DRAWINGS

FIG. 1 is a method flowchart according to an embodiment of the present invention.

FIG. 2 is a method flowchart according to another embodiment of the present invention.

FIG. 4 is a method flowchart according to still another embodiment of the present invention.

Figure 3:
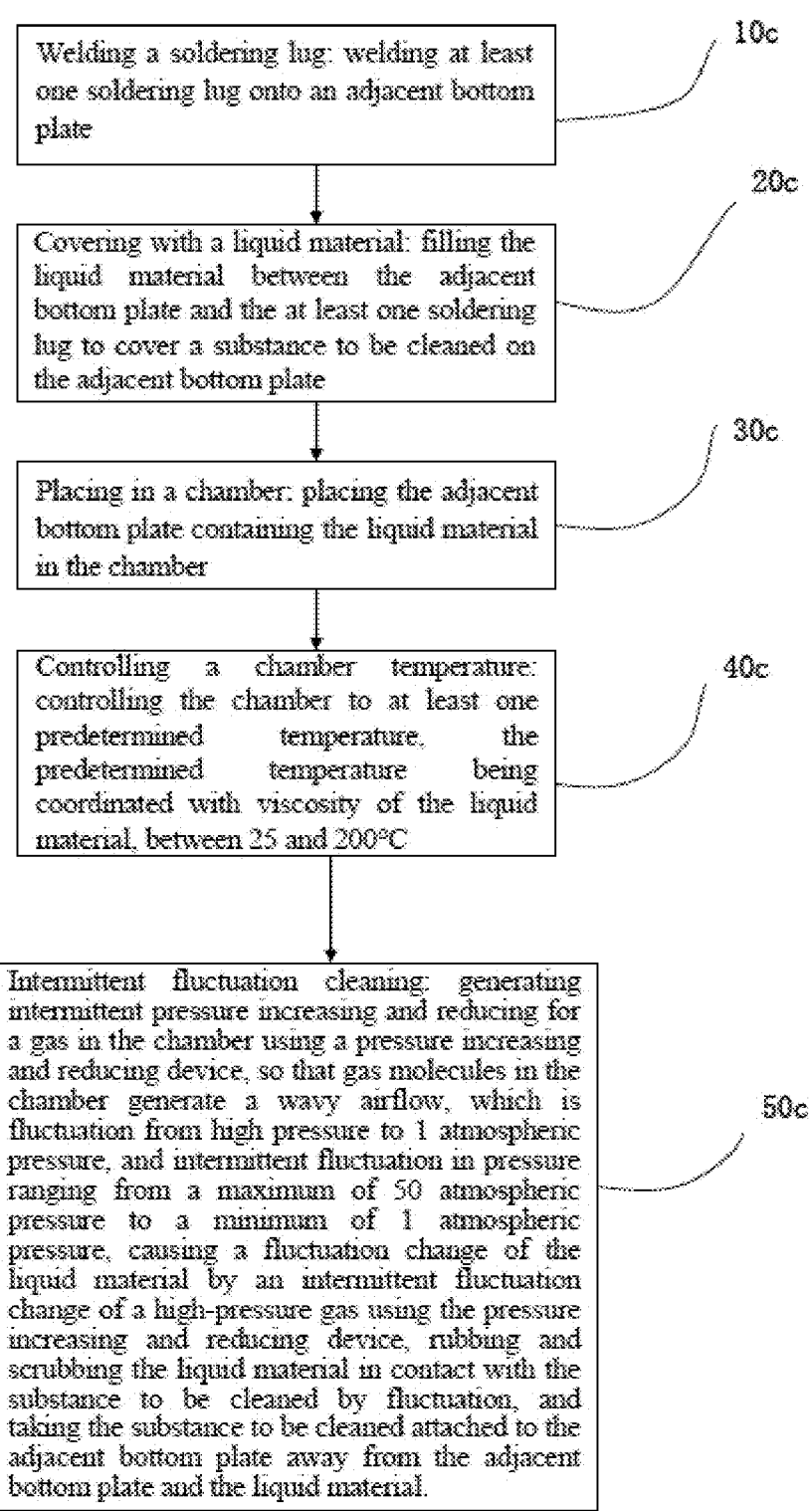
FIG. 3 is a method flowchart according to yet another embodiment of the present invention.

Of the figures: 10a: welding a soldering lug; 20a: covering a liquid material; 30a: placing in a chamber; 40a: controlling a chamber temperature; 50a: intermittent fluctuation cleaning; 10b: welding a soldering lug; 20b: covering a liquid material; 30b: placing in a chamber; 40b: controlling a chamber temperature; 50b: intermittent fluctuation cleaning; 10c: welding a soldering lug; 20c: covering a liquid material; 30c: placing in a chamber; 40c: controlling a chamber temperature; 50*c*: intermittent fluctuation cleaning; 10*d*: welding a soldering lug; 20*d*: covering a liquid material; 30*d*: placing in a chamber; 40*d*: controlling a chamber temperature; 50*d*: physical dissolution cleaning.

DESCRIPTION OF THE EMBODIMENTS

The present invention provides a method of cleaning a bottom plate.

In order to enable your examiner to have a better understanding and knowledge of the purpose, features and effects of the present invention, a detailed description is hereby provided in conjunction with implementations and the appended drawings as follows:

As shown in FIG. 1, the present invention provides a method of cleaning a bottom plate, where steps of the method including:

(a) welding a soldering lug 10*a*: welding at least one soldering lug onto an adjacent bottom plate;

(b) covering with a liquid material 20*a*: filling the liquid material between the adjacent bottom plate and the at least one soldering lug to cover a substance to be cleaned on the adjacent bottom plate;

(c) placing in a chamber 30*a*: placing the adjacent bottom plate containing the liquid material in the chamber;

(d) controlling a chamber temperature 40*a*: controlling the chamber to at least one predetermined temperature, the predetermined temperature being coordinated with viscosity of the liquid material, between 25 and 200° C., to increase fluidity of the liquid material; and (e) intermittent fluctuation cleaning 50*a*: generating intermittent low-pressure control on a gas in the chamber using a vacuum generator, so that gas molecules in the chamber generate a fluctuation airflow through molecular motion, which is fluctuation at low pressure, and intermittent fluctuation in pressure ranging from a maximum of no more than 1 atmospheric pressure to a minimum of $10^{-5}$ atmospheric pressure, causing a fluctuation change of the liquid material using a fluctuation change of the gas generated by intermittent vacuum suction and force release of a low-pressure gas inside the chamber through a vacuum generator, the liquid material also existing between the at least one soldering lug and the adjacent bottom plate, where due to the capillary force between them and the surface tension of the liquid material, the liquid material can be pulled to produce greater fluctuation without causing any overflow issues, rubbing and scrubbing the liquid material in contact with the substance to be cleaned through large energy generated by fluctuation, and taking the substance to be cleaned attached to the adjacent bottom plate away from the adjacent bottom plate and the liquid material more effectively, which achieves an effect that traditional solution cleaning cannot achieve, and can reduce the transfer of direct energy, and alleviate the damage of objects caused by excessive fluctuation or the splashing of the liquid material through the fluctuation of the liquid material pulled by the fluctuation of the gas.

The method of cleaning a bottom plate, where the substance to be cleaned can be a flux, a flux residue, an oil ester, or a photoresist.

The method of cleaning a bottom plate, where the liquid material can be a underfill, the underfill can contain a particle, the particle rolls with fluctuation of the underfill, and a rubbing and scrubbing effect is increased by the particle to help clean a substance to be removed. The liquid material contains the particles just like particles added to a facial scrub to enhance the cleaning effect. The particles are rolled back and forth by the fluctuation of the underfill, which can increase the rubbing and scrubbing effect.

As shown in FIG. 2, the present invention provides another method of cleaning a bottom plate, where steps of the method including:

(a) welding a soldering lug 10*b*: welding at least one soldering lug onto an adjacent bottom plate;

(b) covering with a liquid material 20*b*: filling the liquid material between the adjacent bottom plate and the at least one soldering lug to cover a substance to be cleaned on the adjacent bottom plate;

(c) placing in a chamber 30*b*: placing the adjacent bottom plate containing the liquid material in the chamber;

(d) controlling a chamber temperature 40*b*: controlling the chamber to at least one predetermined temperature, the predetermined temperature being coordinated with viscosity of the liquid material, between 25 and 200° C., to increase fluidity of the liquid material, so that the liquid material can more effectively remove the material to be cleaned from the adjacent bottom plate; and (e) intermittent fluctuation cleaning 50*b*: generating intermittent high-pressure pressure increasing and reducing and intermittent low-pressure vacuum pumping for a gas in the chamber using a pressure increasing and reducing device and a vacuum generator, so that gas molecules in the chamber generate a fluctuation airflow through molecular motion, which is fluctuation of the gas molecules generated between intermittent high pressure carried out by the pressure increasing and reducing device and intermittent low pressure carried out by the vacuum generator, and intermittent fluctuation in pressure ranging from a maximum of 50 atmospheric pressure to a minimum of $10^{-5}$ atmospheric pressure. In other words, the pressure increasing and reducing device controls the gas in the chamber to fluctuate intermittently between 50 atmospheres and greater than 1 atmosphere, and the vacuum generator controls the gas in the chamber to fluctuate intermittently between less than 1 atmosphere and $10^{-5}$ atmospheres, wherein 1 atmosphere is the starting pressure in the chamber (room pressure, atmospheric pressure) .Causing a fluctuation change of the liquid material by an intermittent fluctuation change of the gas molecules using high pressure of the pressure increasing and reducing device and low pressure of the vacuum generator, the liquid material also existing between the at least one soldering lug and the adjacent bottom plate, where due to the capillary force between them and the surface tension of the liquid material, the liquid material can be pulled to produce greater fluctuation without causing any overflow issues, rubbing and scrubbing the liquid material in contact with the substance to be cleaned through large energy generated by fluctuation, and taking the substance to be cleaned attached to the adjacent bottom plate away from the adjacent bottom plate and the liquid material more effectively, which achieves an effect that traditional solution cleaning cannot achieve, and can reduce the transfer of direct energy, and alleviate the damage of objects caused by excessive fluctuation or the splashing of the liquid material through the fluctuation of the liquid material pulled by the fluctuation of the gas.

The method of cleaning a bottom plate, where the substance to be cleaned can be a flux, a flux residue, an oil ester, or a photoresist.

The method of cleaning a bottom plate, where the liquid material can be a underfill, the underfill can contain a particle, the particle rolls with fluctuation of the underfill, and a rubbing and scrubbing effect is increased by the particle to help clean a substance to be removed. The liquid material contains the particles just like particles added to a facial scrub to enhance the cleaning effect. The particles are rolled back and forth by the fluctuation of the underfill, which can increase the rubbing and scrubbing effect.

As shown in FIG. 3, the present invention provides yet another method of cleaning a bottom plate, where steps of the method including:

(a) welding a soldering lug 10*c*: welding at least one soldering lug onto an adjacent bottom plate;

(b) covering with a liquid material 20*c*: filling the liquid material between the adjacent bottom plate and the at least one soldering lug to cover a substance to be cleaned on the adjacent bottom plate;

(c) placing in a chamber 30*c*: placing the adjacent bottom plate containing the liquid material in the chamber;

(d) controlling a chamber temperature 40*c*: controlling the chamber to at least one predetermined temperature, the predetermined temperature being coordinated with viscosity of the liquid material, between 25 and 200° C., to increase fluidity of the liquid material; and (e) intermittent fluctuation cleaning 50*c*: generating intermittent pressure increasing and reducing for a gas in the chamber using a pressure increasing and reducing device, so that gas molecules in the chamber generate a fluctuation airflow through molecular motion, which is fluctuation from high pressure to 1 atmospheric pressure, and intermittent fluctuation in pressure ranging from a maximum of 50 atmospheric pressure to a minimum of 1 atmospheric pressure, causing a fluctuation change of the liquid material by an intermittent fluctuation change of a high-pressure gas using the pressure increasing and reducing device, the liquid material also existing between the at least one soldering lug and the adjacent bottom plate, where due to the capillary force between them and the surface tension of the liquid material, the liquid material can be pulled to produce greater fluctuation without causing any overflow issues, rubbing and scrubbing the liquid material in contact with the substance to be cleaned through large energy generated by fluctuation, and taking the substance to be cleaned attached to the adjacent bottom plate away from the adjacent bottom plate and the liquid material more effectively, which achieves an effect that traditional solution cleaning cannot achieve, and can reduce the transfer of direct energy, and alleviate the damage of objects caused by excessive fluctuation or the splashing of the liquid material through the fluctuation of the liquid material pulled by the fluctuation of the gas.

The method of cleaning a bottom plate, where the substance to be cleaned can be a flux, a flux residue, an oil ester, or a photoresist.

The method of cleaning a bottom plate, where the liquid material can be a underfill, the underfill can contain a particle, the particle rolls with fluctuation of the underfill, and a rubbing and scrubbing effect is increased by the particle to help clean a substance to be removed. The liquid material contains the particles just like particles added to a facial scrub to enhance the cleaning effect. The particles are rolled back and forth by the fluctuation of the underfill, which can increase the rubbing and scrubbing effect.

As shown in FIG. 4, the present invention provides still another method of cleaning a bottom plate, where steps of the method including:

(a) welding a soldering lug 10*d*: welding at least one soldering lug onto an adjacent bottom plate;

(b) covering with a liquid material 20*d*: filling the liquid material between the adjacent bottom plate and the at least one soldering lug to cover a substance to be cleaned on the adjacent bottom plate;

(c) placing in a chamber 30*d*: placing the adjacent bottom plate containing the liquid material in the chamber;

(d) controlling a chamber temperature 40*d*: controlling the chamber to at least one predetermined temperature, the predetermined temperature being coordinated with viscosity of the liquid material, between 25 and 200° C., to increase fluidity of the liquid material; and (e) physical dissolution cleaning 50*d*: generating at least a predetermined pressure ranging from a maximum of 50 atmospheric pressure to a minimum of 1 atmospheric pressure in the chamber using a pressure increasing device, dissolving the substance to be cleaned attached to the adjacent bottom plate in the liquid material using physical dissolution generated by contacting the filled liquid material with the substance to be cleaned, and taking the substance to be cleaned attached to the adjacent bottom plate away from the adjacent bottom plate and the liquid material using diffusion force generated by the predetermined temperature and a concentration gradient after dissolution, achieving an effect that traditional solution cleaning cannot achieve.

The method of cleaning a bottom plate, where the substance to be cleaned can be a flux, a flux residue, an oil ester, or a photoresist.

The present invention places an adjacent bottom plate containing a substance to be cleaned in a chamber, which is covered with a liquid material, causes a fluctuation change of the liquid material using a fluctuation change of the gas, rubs and scrubs the liquid material in contact with the substance to be cleaned through large energy generated by fluctuation, and taking the substance to be cleaned attached to the adjacent bottom plate away from the adjacent bottom plate and the liquid material, achieving an effect that traditional solution cleaning cannot achieve. In addition, a pressurized environment increases the number of gas molecules, resulting in an increase in a gas density, as well as an increase in gas flow viscosity and an increase in the internal pressure of the liquid material, which can improve the effect of cleaning the substance, also slow down the shock wave of gas injection or the gravitational wave of gas extraction, and reduce adverse effects.

As can be seen from the above, the method of cleaning the base bottom plate of the present invention is indeed the first in the industry and meets the novelty requirements of the invention patent, and its comprehensive innovative design meets the progressive requirements of the invention patent. The method uses a liquid material to fill between a soldering lug and an adjacent bottom plate and cover a material to be cleaned on the adjacent bottom plate, and places the adjacent bottom plate in a chamber, raises a temperature and applies airflow fluctuation of intermittent pressure increasing and reducing or intermittent vacuum pumping, drives the rubbing or stirring effect of the liquid material, improving the cleaning efficiency of a residue and meeting the best industrial utilization.

The foregoing is a specific description of the technical features of the present invention in relation to a preferred embodiment of the present invention; however, those skilled in the art can make changes and modifications to the present invention without departing from the spirit and principles of the present invention, and these multiple changes and modifications should be covered within the scope defined by the claims.

In summary, the present invention provides a method of cleaning a bottom plate, which has indeed achieved all the purposes of the present invention. In addition, the spatial form of the combined structure has not been seen in similar products, nor has it been disclosed before the application, which complies with the provisions of the Patent Law. Therefore, the application is filed in accordance with the law.

What is claimed is:

1. A method of cleaning a bottom plate, wherein steps of the method comprising:

(a) welding a soldering lug: welding at least one soldering lug onto an adjacent bottom plate;

(b) covering with a liquid material: filling the liquid material between the adjacent bottom plate and the at least one soldering lug to cover a substance to be cleaned on the adjacent bottom plate;

(c) placing in a chamber: placing the adjacent bottom plate containing the liquid material in the chamber;

(d) controlling a chamber temperature: controlling the chamber to at least one predetermined temperature, the predetermined temperature being coordinated with viscosity of the liquid material, between 25 and 200° C., to increase fluidity of the liquid material; and (e) intermittent fluctuation cleaning: generating intermittent high-pressure pressure increasing and reducing and intermittent low-pressure vacuum pumping for a gas in the chamber using a pressure increasing and reducing device and a vacuum generator, so that gas molecules in the chamber generate a fluctuation airflow through molecular motion, which is fluctuation of the gas molecules between intermittent high pressure and intermittent low pressure, and intermittent fluctuation in pressure ranging from a maximum of 50 atmospheric pressure to a minimum of $10^{-5}$ atmospheric pressure, causing a fluctuation change of the liquid material by an intermittent fluctuation change of the gas molecules using high pressure of the pressure increasing and reducing device and low pressure of the vacuum generator, rubbing and scrubbing the liquid material in contact with the substance to be cleaned by fluctuation, and taking the substance to be cleaned attached to the adjacent bottom plate away from the adjacent bottom plate and the liquid material.

2. The method of cleaning a bottom plate according to claim 1, wherein the substance to be cleaned is capable of being a flux, a flux residue, an oil ester, or a photoresist.

3. The method of cleaning a bottom plate according to claim 1, wherein the liquid material is capable of being a underfill, the underfill is capable of containing a particle, the particle rolls with fluctuation of the underfill, and a rubbing and scrubbing effect is increased by the particle.

* * * * *